Sept. 7, 1954     D. W. WAGNER     2,688,177
CAPACITOR
Filed March 24, 1950
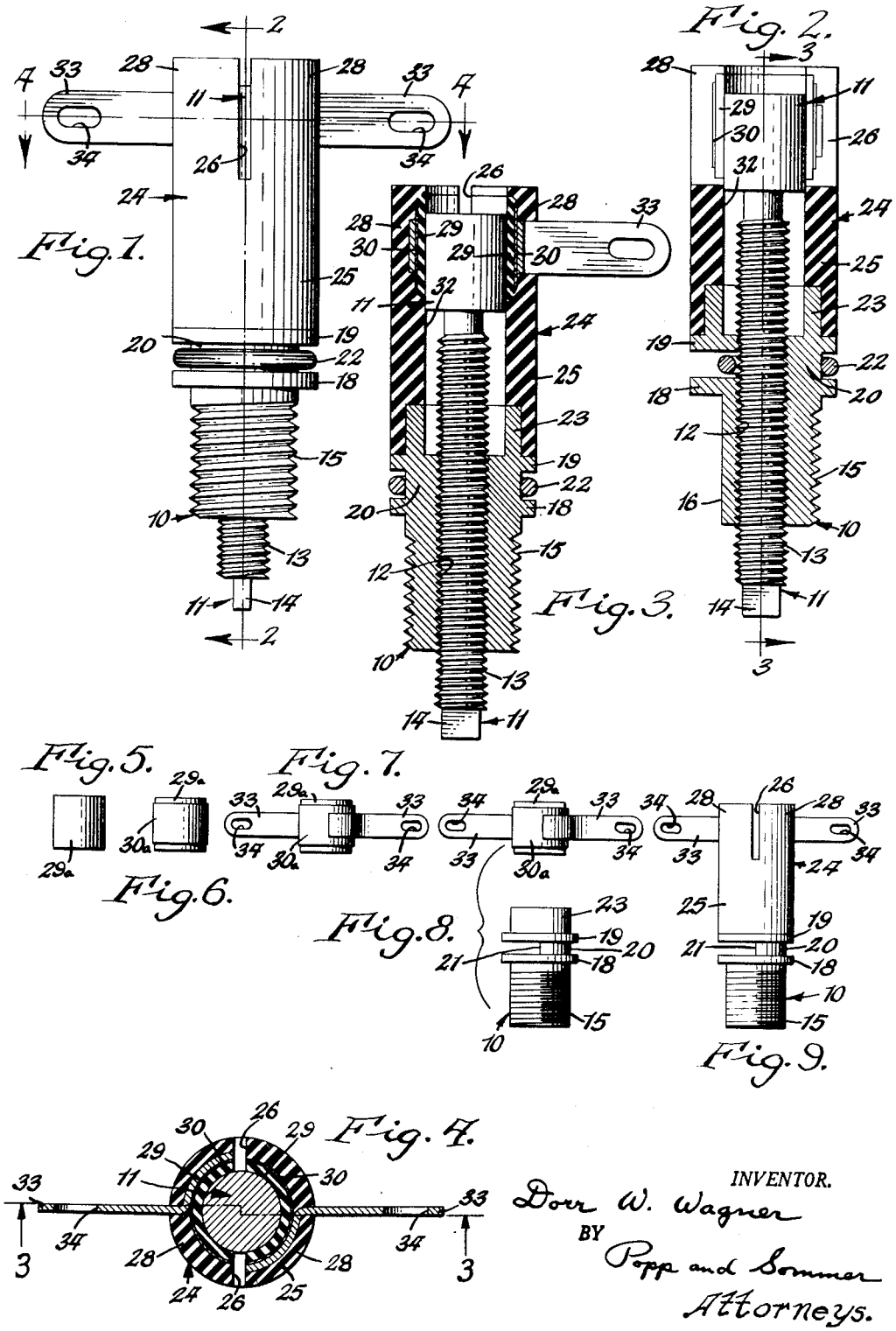
INVENTOR.
Dorr W. Wagner
BY Popp and Sommer
Attorneys.

Patented Sept. 7, 1954

2,688,177

UNITED STATES PATENT OFFICE 2,688,177

CAPACITOR

Dorr W. Wagner, Franklinville, N. Y., assignor, by mesne assignments, to Aerovox Corporation, New Bedford, Mass., a corporation of Massachusetts Application March 24, 1950, Serial No. 151,680

1 Claim. (Cl. 29—25.42)

This invention relates to a capacitor and method of making the same and more particularly to a multiple section capacitor the capacities of which can be varied through the adjustment of a common electrode or plate.

One of the principal objects of the invention is to provide a unitary multiple section capacitor which can be adjusted with an extremely high degree of fineness and in particular to extremely fine minimum capacities.

Another object is to provide such a capacitor which can be made of any desired size or capacity.

Another object is to provide such a multiple section capacitor which is variable through the adjustment of an electrode which is common to the other sections or plates and in which the capacities between the sections are reduced to a minimum value.

Another object is to provide such a unitary capacitor which is strong and durable in construction and can be produced at low cost.

Other objects and advantages of the invention will appear from the following description and drawings in which:

Fig. 1 is a side elevational view of the multiple section capacitor made in accordance with and embodying the present invention.

Fig. 2 is a vertical section therethrough and taken on line 2—2, Fig. 1.

Fig. 3 is a vertical section taken generally on line 3—3, Figs. 2 and 4.

Fig. 4 is a horizontal section taken on line 4—4, Fig. 1.

Figs. 5–9 are diminutive side elevational views of the capacitor during progressive stages of its manufacture; Fig. 5 showing the dielectric cylinder which separates the multiple plate sctions of the capacitor from the common electrode; Fig. 6 showing a metal coating applied externally to this cylinder; Fig. 7 showing the multiple section terminals applied to this metal coating; Fig. 8 showing the movable electrode holder brought into the proper spacial relation with this cylinder; and Fig. 9 showing the parts shown in Fig. 8 united by a body of insulation material molded thereto and the said cylinder radially slotted to divide its metal coating into two or more capacitor sections with air gaps therebetween.

The capacitor shown in the drawings was primarily designed as a trimmer capacitor for use in television receivers and the like and hence is shown in greatly enlarged size although, as previously indicated, it can be made of any desired size or capacity. The capacitor is shown as having a holder 10 for the adjustable common bare metal electrode 11, this holder and terminal 10 being shown as comprising a metal bushing or fitting which is internally threaded, as indicated at 12, to receive the threaded stem 13 of the adjustable common electrode 11 the end 14 of which projects outwardly from the fitting 10 and is shown as squared to be readily turned to the desired adjustment by the use of insulated pliers. However, any suitable means for adjusting the electrode 11 relative to the fitting 10 may be employed, as for example providing a slot (not shown) in the lower end of the stem 13 to receive an insulated screw driver or similar tool.

One end portion of the bushing or fitting 10 is shown as provided with external threads 15 and as having a segment of this threaded portion removed as indicated at 16 and beyond this threaded portion 15 the bushing is formed with a pair of axially spaced outwardly projecting flanges 18 and 19 forming between them a reduced neck 20 one half of which is cut away, as indicated at 21, to expose the side of the threaded stem 13 of the adjustable common electrode 11 as best shown in Figs. 2, 8 and 9. The reduced neck 20 and the corresponding exposed part of the threaded neck 13 of the adjustable common electrode 11 are shown as embraced by a conventional spring clip 22, this clip serving to yieldingly hold the adjustable common electrode in its set or adjusted position. Beyond the flange 19 the bushing or fitting 10 is provided with an axially extending tubular neck 23 which is of reduced diameter as compared with the flanges 18 and 19.

The axially extending neck 23 supports a tubular sleeve made of suitable insulation material, indicated generally at 24. This sleeve is composed of an outer tubular sleeve section 25 surrounding and projecting from the neck 23 the outer end of this outer tubular sleeve section 25 being split by two or more slots forming air gaps 26 extending through the wall of the tubular sleeve section 25 and axially along the sleeve section. In the drawing a pair of slots 26 are diametrically disposed to provide a pair of semicylindrical finger extensions 28 at the end of the sleeve section 25. The wall thickness of the body or sleeve 24 is less than the diameter of the bore therethrough.

Embedded in the internal faces of the two finger extensions 28 are a pair of inner sections 29 which are made of a dielectric material and are of semicylindrical form and which are provided on their outer faces with metal coatings 30, likewise of semicylindrical form, and extending between the slots or air gaps 26. These inner sections 29 form a continuation of the bore 32 of the outer sleeve section 25 and are preferably united thereto by molding the outer sleeve section 25 around these inner semicylindrical sections 29 as hereinafter described. Each of the metal plates or coatings 30 is partly embraced by one end of a metal terminal strip 33, the free end of which is bent to project outwardly through the outer tubular sleeve section 25 and is provided with an elongated opening 34 for convenient attachment, as by soldering, to the wires with which the capacitor is to be used.

In the practice of the present invention the method of making the capacitor as above described is as follows:

A tube of dielectric material, such as titanium dioxide is first cut into lengths 29a as shown in Fig. 5, the length of this section being equal to the length of the two inner semicylindrical sections 29. A coating 30a in the form of a continuous band of metallic paint, such as minute particles of silver in a carrier, is then applied to the exterior of the dielectric cylinder 29a by brushing, spraying or in any other suitable manner, the cylinder 29a so coated with silver paint being illustrated in Fig. 6. The cylinder 29a with its metallic coating is then fired at a relatively high temperature, say 1400° F., to drive off the solvents and to leave a metallic coating on the dielectric cylinder 29a, the silver particles being bonded by the residual glaze but being exposed and in contact with one another. As best shown in Fig. 7, the ends of two of the terminal strips 33 are then applied to opposite sides of the silver coating 30a so as to practically embrace the same, these ends being secured to the silver coating by solder or in any other suitable manner. The free ends of the metal terminals 33 are then preferably bent to extend radially from the cylinder.

In a suitable die (not shown) the metal coated cylinder 29a, together with the terminal strips 33 are then brought into the relation shown in Fig. 8 with the metal bushing or fitting 10. This relation is such that these parts are coaxial with the axially extending sleeve 23 of the bushing 10 projecting toward the dielectric sleeve 29a but in spaced relation thereto. The outer sleeve section 25 is then molded around the axially projecting sleeve 23 and the dielectric cylinder 29a with the terminal strips 33 projecting radially outwardly therefrom. This outer sleeve section 25 can be of any insulation material and preferably is made of a suitable plastic material. The plastic material of which the outer tubular sleeve section 25 is composed completely embeds the metallic coating 30a as well as the ends on the dielectric sleeve 29a, the capacitor being left with the continuous bore 32 which is of the same diameter as the internal diameter of the dielectric sleeve 29a.

The diametrically opposite slots 26 are then provided, these preferably being formed by sawing the end of the outer tubular sleeve section 25 so as to provide the two finger sections 28 and these diametrically opposite saw cuts extending completely through the metal coating 30a as well as the dielectric cylinder 29a so as to divide these, respectively, into the semicylindrical metal plates 30 and the semicylindrical inner sections 29. The kerfs or notches 26 are provided so as not to cut through the terminal strips 33 whereby each of the semicylindrical metal plates 30 is provided with an individual terminal strip 33 projecting outwardly through the tubular sleeve section 25 molded thereto. The threaded stem of the adjustable common electrode 11 is then screwed into the bushing 10 and the snap ring 22 placed between the two flanges 18 and 19 to engage the exposed thread of the stem of this adjustable common electrode 11 and maintain its adjustment. The common electrode 11 is in mating relation with the internal face of the sleeve or body 24.

The capacitor as above described can be used with its three elements in series by connecting its terminal strips 33 to the wires of the circuit and leaving the adjustable common electrode 11 floating. In such a circuit arrangement an extremely fine adjustment of the capacity of the capacitor can be made by screwing the adjustable common electrode 11 so as to vary its relation to the two semicylindrical capacitive plates 30. In obtaining this highly sensitive adjustment of the capacitor a most important feature of the present invention resides in the fact that the semicylindrical plates 30 are separated at their adjacent edges by air gaps provided by the slots 26. If these air gaps 26 were not present the fringing capacity through the dielectric material would be much higher, as compared with the air gap shown, and accordingly the provision of the air gaps 26 enables the capacitor to be adjusted to much finer minimum capacities than without the air gaps.

For example, assuming that the tubular dielectric body of the capacitor, including the tube 29a, has a dielectric constant of 135 and that the tube 29a has a length of one quarter of an inch and a wall thickness of .021 inch, and instead of being split has applied thereto two metallic coatings 30a each occupying 90° of the outer face of the tube and spaced 90° apart, the minimum capacity between the parallel edges of these metallic coatings would be approximately 2.6 mmf. In contrast, by the practice of the present invention to provide a circular coating around the entire electrode and then cutting the slits 26 to have a width of .015, the above fringing capacity between the parallel edges of the two metallic sections is reduced to 0.5 mmf. Also it will be seen that the area of the sections is greatly increased by the provision of a .015 cut as compared with the assumed 90° spacing of the coatings, it having been found that the metallic coating sections can terminate at the two cuts and that these cuts can be very narrow without materially increasing the fringing capacity of the two sections.

From the foregoing it will be seen that the present invention, by the simple expedient of slitting a metal coated dielectric body to have a plurality of capacitor sections separated by air gaps and cooperating with a common electrode, provides capacitors having much finer minimum capacities than would otherwise obtain.

I claim:

The method of making a multiple section capacitor, which comprises applying a tubular metallic coating in the form of a continuous band to a radially facing surface of a first tube of dielectric material, incorporating said first tube of dielectric material in a second tube of dielectric material with said metallic coating arranged at one end of said second tube and with said second tube covering said metallic coating, thereafter sawing said one end of said second tube axially from the end thereof completely through the metallic coating on said first tube but short of the opposite end of said second tube to divide said metallic coating into two arcuate sections separated along their axially extending edges by the air gaps provided by said slits and embedded in axially extending fingers of arcuate form in cross section, and thereafter arranging said combined tubes in concentric relation with a common metal electrode and with the dielectric material forming one of said tubes interposed between the common electrode and the metallic coating sections.

References Cited in the file of this patent

UNITED STATES PATENTS

| Number | Name | Date |
|---|---|---|
| 1,873,450 | McFarlin | Aug. 23, 1932 |
| 2,212,231 | Gossel | Aug. 20, 1940 |
| 2,305,355 | Lips | Dec. 15, 1942 |
| 2,390,009 | Stott | Nov. 27, 1945 |
| 2,541,749 | DeLange | Feb. 13, 1951 |

FOREIGN PATENTS

| Number | Country | Date |
|---|---|---|
| 263,948 | Great Britain | Jan. 10, 1927 |
| 541,712 | Great Britain | Dec. 8, 1941 |
| 648,228 | Great Britain | Jan. 3, 1951 |